United States Patent [19]

Hasegawa

[11] 4,286,855

[45] Sep. 1, 1981

[54] ELECTROMAGNETIC RELEASING DEVICE

[75] Inventor: Hiroshi Hasegawa, Tokyo, Japan

[73] Assignee: Nippon Kogaku K.K., Tokyo, Japan

[21] Appl. No.: 969,736

[22] Filed: Dec. 15, 1978

[30] Foreign Application Priority Data

Dec. 20, 1977 [JP] Japan .......................... 52-170611[U]

[51] Int. Cl.³ .......................................... G03B 17/40
[52] U.S. Cl. .................................... 354/234; 354/266
[58] Field of Search .............. 354/266, 267, 268, 234, 354/235, 50, 51; 361/152–156

[56] References Cited

U.S. PATENT DOCUMENTS 4,143,958   3/1979   Ishiguro et al. ...................... 354/267
4,164,370   8/1979   Kimura et al. .................. 354/234 X Primary Examiner—L. T. Hix
Assistant Examiner—W. J. Brady
Attorney, Agent, or Firm—Shapiro and Shapiro

[57] ABSTRACT

In an electromagnetic releasing device for exciting a release magnet for a predetermined time after depression of a release button to thereby elect shutter release, there is provided a circuit which generates, in response to the depression of the release button, a signal whose time width is short independently of the depression time of the release button. The excitation of the release magnet is initiated by the signal from said circuit. With this circuit, one depression of the release button results in only one releasing operation.

6 Claims, 1 Drawing Figure

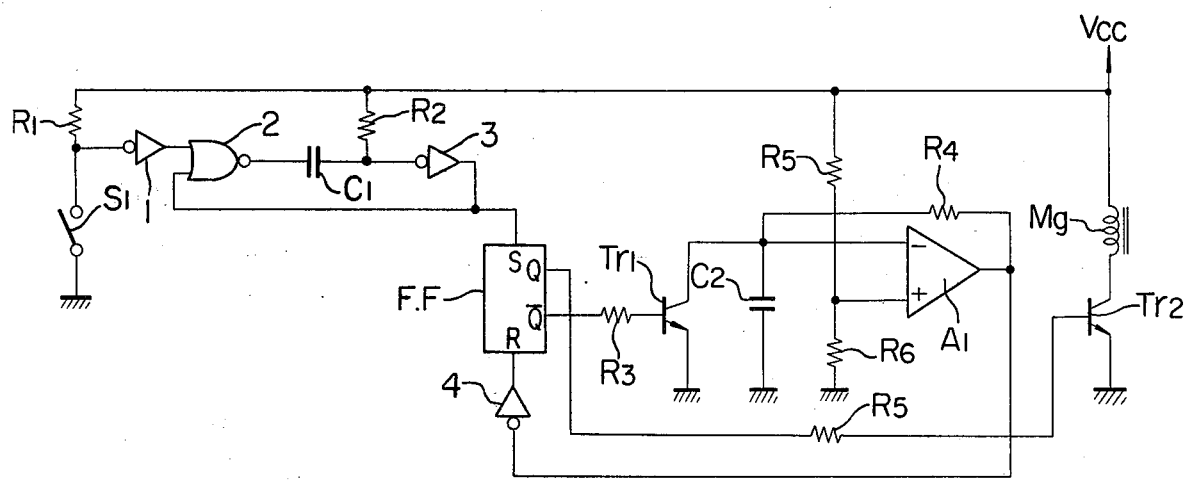

ELECTROMAGNETIC RELEASING DEVICE

BACKGROUND OF THE INVENTION

1. Field of the Invention

This invention relates to an electromagnetic shutter releasing device.

2. Description of the Prior Art

The shutter releasing operation of a camera having an electromagnetic releasing device is usually accomplished by depressing a shutter release button to close a switch operatively associated with the shutter release button to thereby excite a release magnet. However, the electromagnetic releasing devices according to the prior art have suffered from a disadvantage that shutter releasing operation again takes place if film is advanced and the shutter release button remains depressed.

SUMMARY OF THE INVENTION

It is an object of the present invention to provide an electromagnetic releasing device in which one depression of the release button results in only one releasing operation.

The invention will become fully apparent from the following detailed description of an embodiment thereof shown in the accompanying drawing.

BRIEF DESCRIPTION OF THE DRAWING

The drawing is a circuit diagram of the electromagnetic releasing device according to the present invention.

DESCRIPTION OF THE PREFERRED EMBODIMENTS

Referring to the drawing, a release switch S1 and a resistor R1 are connected in series between a power source Vcc and a common terminal. The input terminal of an inverter 1 is connected to the junction between the switch S1 and the resistor R1. Depression of an unshown shutter release button causes closing of the release switch S1, so that the input of the inverter 1 assumes the same potential (low level L) as the common terminal and the output thereof assumes high level H. Since the output of the inverter 1 is applied to one input terminal of NOR gate 2, the output of the NOR gate 2 assumes low level L. Thus, a low level L is momentarily applied to the input terminal of an inverter 3 connected to the output terminal of the NOR gate 2 through a capacitor C1. As a result, the output of the inverter 3 assumes high level H which is applied as a set signal to the set input S of an S-R flip-flop FF. Since the input terminal of the inverter 3 is also connected to the power source Vcc through a resistor R2, the capacitor C1 is charged by a time constant determined by the resistor R2 and capacitor C1, so that the input voltage of the inverter 3 is increased. When the input voltage of the inverter 3 is increased to a certain level, the output of the inverter 3 assumes low level L to eliminate the set signal. The time period from the point in time when the set signal is produced until the set signal is exhausted may desirably be set to the shortest possible sufficient time to set the S-R flip-flop and must, at longest, be within the short time from when the flip-flop FF is set until it is reset. When a set signal is applied thereto, the S-R flip-flop puts out a high level H from its first output terminal Q and a low level L from its second output terminal Q. A release magnet Mg and a switching transistor Tr2 are also connected in series between the power source Vcc and the common terminal. Since the base of the switching transistor Tr2 is connected to the first output terminal Q of the S-R flip-flop FF, a high level H is put out from the first output Q of the S-R flip-flop FF to thereby turn on the switching transistor Tr2. The result is that the shutter release magnet Mg is excited to initiate the releasing operation. The second output terminal Q of the S-R flip-flop FF is connected to the base of a transistor Tr1 through a resistor R3. The emitter of the transistor Tr1 is connected to the common terminal and the collector thereof is connected to the inverting input terminal (−) of an operational amplifier A1. A capacitor C2 is connected between the inverting input terminal of the operational amplifier A1 and the common terminal, and a resistor R4 is connected between the output terminal and the inverting input terminal (−) of the operational amplifier A1. The junction between resistors R5 and R6 connected in series between the power source Vcc and the common terminal is connected to the non-inverting input terminal (+) of the operational amplifier A1. The operational amplifier A1 generates high level H when the potential at the non-inverting input terminal (+) is higher than the potential at the inverting input terminal (−), and puts out low level L when the potential at the non-inverting input terminal (+) is lower than the potential at the inverting input terminal (−). Now, the second output q of the S-R flip-flop FF is at low level L and so, the transistor Tr1 is non-conductive. When the transistor Tr1 becomes non-conductive, the potential at the inverting input terminal (−) of the operational amplifier A1 begins to increase and after a predetermined time determined by the time constant of the resistor R4 and the capacitor C2, the potential at the inverting input terminal (−) becomes equal to the potential at the non-inverting input terminal (+). The output of the operational amplifier A1 then assumes low level L. Since the output terminal of the operational amplifier A1 is connected to the reset terminal R of the S-R flip-flop FF through an inverter 4, the S-R flip-flop FF is reset. As the result, low level L is created at the first output terminal Q and high level H at the second output terminal Q, and the transistor Tr1 becomes conductive while the transistor Tr2 becomes non-conductive. If the switch S1 remains closed, the output of the one-shot circuit comprising the NOR gate 2, capacitor C1, resistor R2 and inverter 3, namely, the output of the inverter 3 remains at low level L, so that the S-R flip-flop maintains its reset condition and the release magnet Mg is not excited even if the film is advanced in this condition.

The time period from the point in time at which the transistor Tr1 has become non-conductive until the potential at the inverting input terminal (−) of the operational amplifier A1 becomes equal to the potential at the non-inverting input terminal (+) thereof is set to a necessary and sufficient time for the release magnet Mg to begin its releasing operation.

According to the present invention, as has hitherto been described, there is provided a circuit which generates, in response to depression of the release button, a signal whose time width is short independently of the depression time of the release button and the excitation of the release magnet is initiated by this signal and the signal for exciting the release magnet is produced only for a short time after the depression of the release button and therefore, even if the release button remains depressed, the shutter is not released even when the film is advanced once the shutter has been released.

I claim:

1. An electromagnetic releasing device for energizing a shutter release magnet, comprising a switch in series with said magnet for energizing said magnet when the switch is conductive, a bistable circuit having a first output connected to said switch for rendering said switch conductive when the bistable circuit is set in a first state, means responsive to actuation of a shutter release button for setting said bistable circuit in said first state, and means independent of whether said button remains actuated for resetting said bistable circuit in a second state a predetermined time after it is set in said first state and for thereby rendering said switch nonconductive, said resetting means comprises a timing circuit connected to a second output of said bistable circuit.

2. An electromagnetic releasing device in accordance with claim 1, wherein said timing circuit comprises amplifier means for generating a reset pulse for resetting said bistable circuit at said predetermined time, and means for selecting said predetermined time to be sufficient for said magnet to begin a releasing operation.

3. An electromagnetic releasing device in accordance with claim 2, wherein said selecting means comprises an R-C circuit, and wherein said amplifier means compares the voltage across an element of said R-C circuit with a predetermined voltage and generates said reset pulse when the two voltages have a predetermined relationship.

4. An electromagnetic releasing device in accordance with claim 3, wherein the second output of said bistable circuit controls the voltage across said element.

5. An electromagnetic releasing device in accordance with claim 1, wherein said means for setting said bistable circuit in said first state comprises circuit means responsive to the actuation of said switch for generating a set pulse having a predetermined time duration which is independent of the time the switch remains actuated.

6. An electromagnetic releasing device in accordance with claim 5, wherein said circuit means comprises a one-shot circuit.

* * * * *